United States Patent Office 3,303,819
Patented Feb. 14, 1967

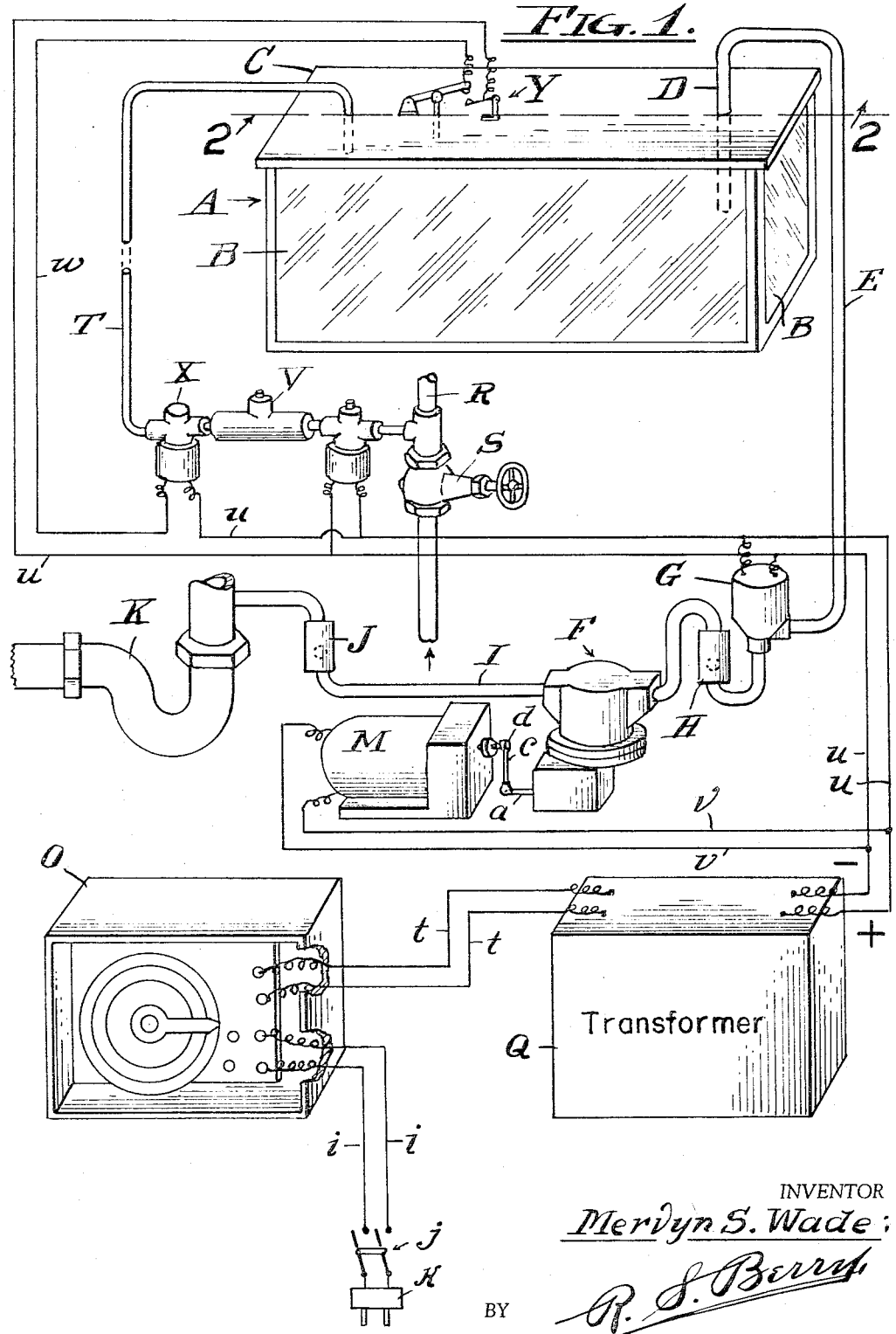

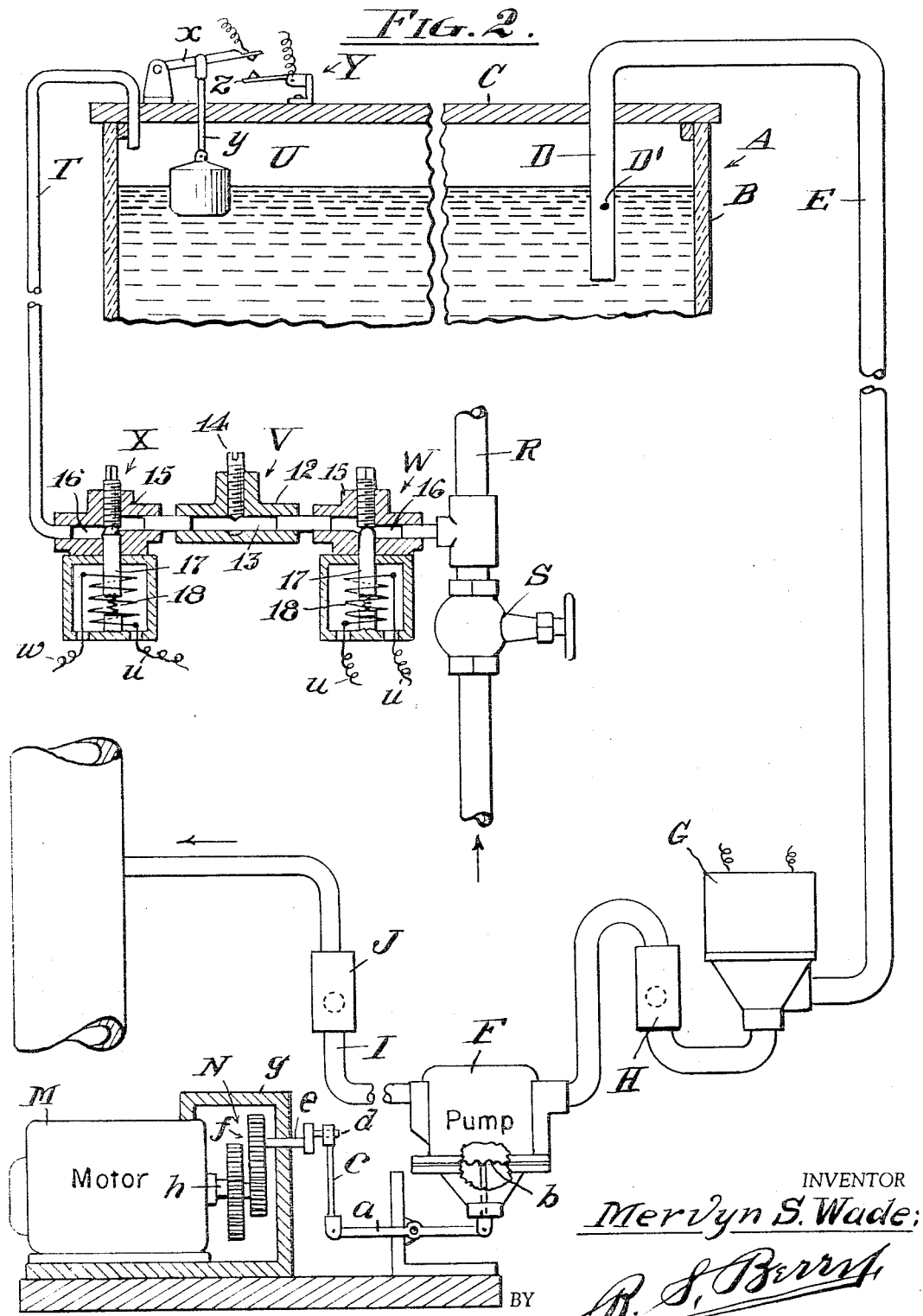

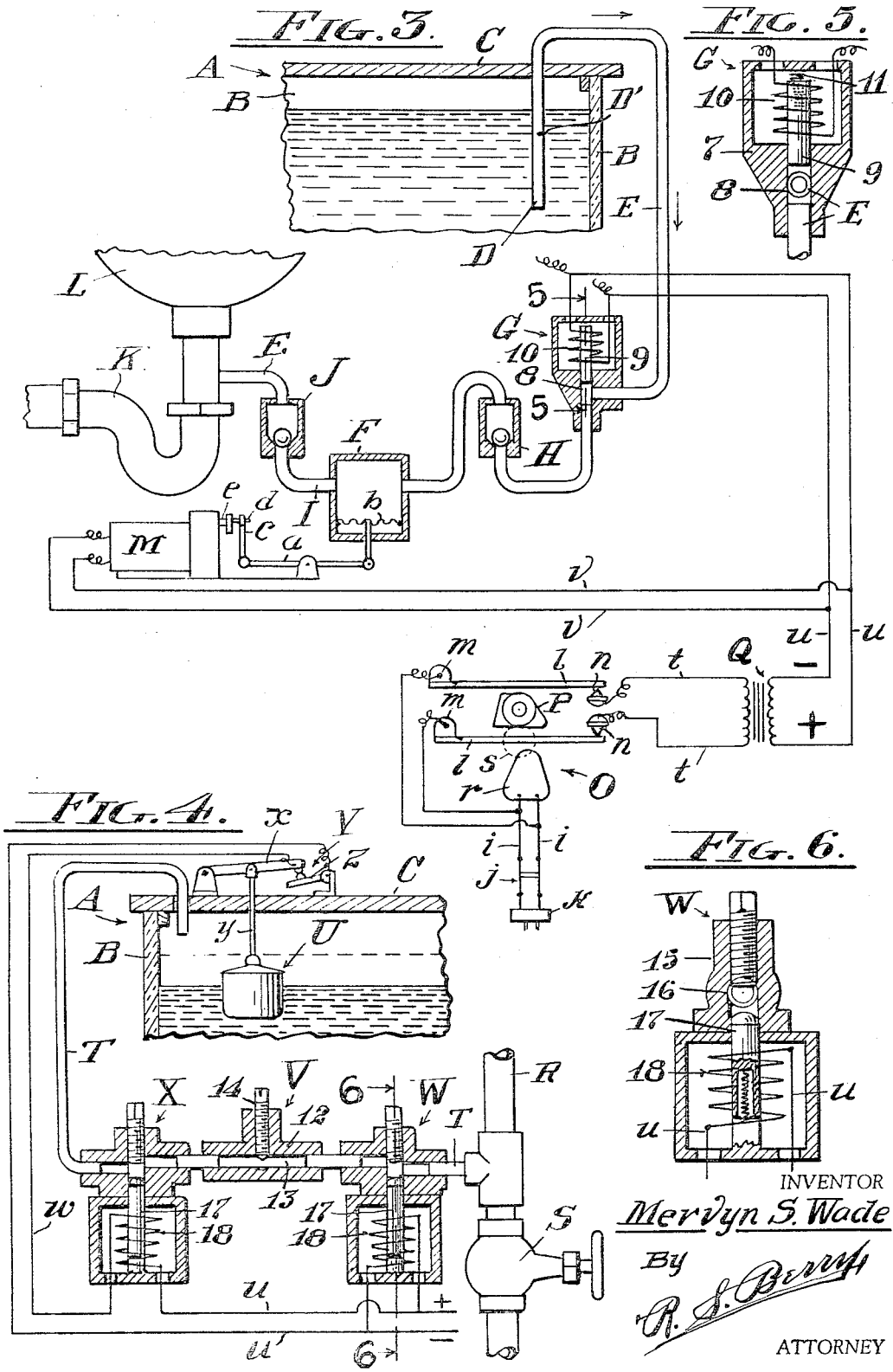

3,303,819
APPARATUS FOR CONDITIONING AQUARIUMS
Mervyn S. Wade, 12942 Gilmore,
Los Angeles, Calif. 90066
Filed Aug. 2, 1965, Ser. No. 476,387
8 Claims. (Cl. 119—5)

This invention relates to an apparatus for conditioning aquariums particularly such as are employed in keeping and cultivation of tropical fish.

The primary object of the invention is to provide an apparatus whereby a predetermined volume of the water content of an aquarium may be automatically withdrawn from the aquarium at regular intervals and be replaced by a volume of fresh water, whereby the water in the aquarium will be maintained substantially fresh and stagnant free and whereby the formation of algae and other aquatic plants which are productive of scum and impurities harmful to and destructive of the fish inhabitant of the aquarium and particularly the delicate tropical fish, will be prevented.

Another object of the invention is to provide an apparatus of the above character which is highly efficient and which will enable the keeping of a much larger number of tropical fish per gallon of water than has heretofore been considered feasable, and whereby the fish laden aquarium may be exposed to direct sunlight without detriment, now generally deemed undesirable because sunlight stimulates the growth of detrimental algae.

The invention generally considered embodies an electrically actuated pump for removing and delivering to discharge a portion of the water from a fish tank or aquarium, together with an electric motor for periodically operating the pump under the control of a conventional timing mechanism, and also embodying a float controlled mechanism for delivering fresh water to the tank to compensate for the volume of water removed by the pump coupled with means for regulating the volume and pressure of the feed water; and which apparatus is adapted to be applied to the conventional household aquarium and installed wherever fresh water under pressure, wastewater disposal and electric current is available.

With the foregoing objects in view together with such other objects and advantages as may subsequently appear, the invention is hereinafter described and claimed, and illustrated by way of example in the accompanying drawings in which:

FIG. 1 is an isometric view of a schematic arrangement of the various parts of the apparatus and depicting the electrical wiring associated therewith;

FIG. 2 is an enlarged view in vertical section of the aquarium as seen on the line 2—2 of FIG. 1, together with the water discharging and replacing mechanism partly in vertical section and elevation in schematic arrangement relative to the aquarium, with the parts disposed in their out-of-operative position;

FIG. 3 is a diagrammatic view in section and elevation of the water discharging portion of the apparatus with the parts disposed in their operating position;

FIG. 4 is a diagrammatic view in section and elevation of the water replenishing portion of the apparatus with the parts disposed in their operating position;

FIG. 5 is a view in section taken on the line 5—5 of FIG. 3 showing the valve in its open position; and FIG. 6 is a view in section as seen on the line 6—6 of FIG. 4 showing the valve in its open position.

Referring to the drawing more specifically, A indicates generally a conventional fish tank or aquarium of box-like form having transparent side and end walls B and fitted with a cover comprising a removable panel C which seats on the upper margins of the walls B.

Leading vertically through the panel C is a siphon tube D the lower end of which opens to the interior of the tank A about midway of the depth thereof. The upper end of the tube D connects with a downwardly extending conduit E leading to the intake of a diaphragm pump F through a solenoid actuated control valve G and a ball check-valve H, which assemblage is located at a convenient point below the tank A.

The tube D is provided with a siphon breaking aperture D' located a distance beneath the normal level of the body of water contained in the aquarium according to the volume of water to be discharged through the tube at a time which will vary with varying conditions such as size of the tank and the number of its fish inhabitants; the aperture D' admitting air to the tube when the water level is lowered sufficiently to uncover the aperture, thus determining any siphoning action.

The control valve G particularly shown in FIG. 5, embodies a housing 7 having a passage 8 to and from which the conduit E leads, which passage is normally closed by a spring pressed plunger valve 9 constituting the core of a solenoid magnet 10 which on being energized moves the valve 9 to its open position as indicated in FIG. 5 in opposition to a spring 11 bearing on the upper end of the valve 9.

The outlet of the pump F connects with a conduit I leading through a check-valve J to a suitable point of discharge, here shown as comprising the intake side of the trap K of a plumbing fixture L, such as a lavatory bowl, as indicated in FIG. 3, whereby on operation of the pump F water will be evacuated in part from the previously filled tank and delivered to the trap K from whence it passes to a sewage system or other point of delivery.

The pump F is actuated by an electric motor M through a driving mechanism N here shown as comprising a rocker-arm $a$ having one end connected to the diaphragm $b$ of the pump and having its other end connected to a link $c$ leading to a crank $d$ on a shaft $e$ rotated by transmission mechanism $f$ in a gear-box $g$. The mechanism N is actuated by the drive shaft $h$ of the motor M in the usual manner.

The motor M is operated at periodic intervals under the control of a conventional circuit controlling electrically actuated time switch O, to which alternating electric current is fed from a source of supply of 120 volt current through conductors $i$—$i$, switch $j$ and connector $k$. The time switch O embodies a pair of parallel spring contact arms $l$—$l$ indicated in FIG. 3, which as is common in time switches have resilient inner ends connected to binding posts $m$—$m$ and have free outer ends normally in closed electrical connection with contacts $n$—$n$. A rotary cam P is interposed between the contact arms $l$—$l$ and is operable on each revolution thereof to move the arms $l$—$l$ out of connection with the contacts $n$—$n$ to thereby open the switch O. The cam P is actuated by an electric motor $r$ through a gear train $s$ in the usual manner, the motor $r$ being activated by A.C. electric current supplied through the conductors $i$—$i$ on closing the switch $j$.

When the time switch O is closed as indicated in FIG. 3, A.C. current is directed through conductors $t$—$t$ to a conventional transformer Q where the alternating current is converted into direct current of low voltage which is delivered to a pair of main conductors $u$—$u$ from which conductors $v$—$v$ lead to and from the motor M to supply operating current thereto during closing of the time switch O. The course of the conductors of the direct current and the elements actuated thereby will be presently described.

Leading from a suitable source of fresh water supply under pressure is a conduit R fitted with an emergency cut-off valve S, which conduit may comprise the cold water supply pipe of a domestic lavatory, sink or the like.

Connecting with the conduit R is a feed-pipe T which leads to the aquarium A and has its outer end portion leading downward through the cover panel C and opening to the aquarium to deliver fresh water to the latter at intervals under control of a float U within the aquarium responsive to variation of the water level in the latter as will presently be described.

Interposed in a horizontal length of the feed-pipe T leading from the conduit R is a series of feed water controlling elements comprising a manually adjustable pressure regulating valve V flanked by a pair of solenoid controlled cut-off valves W–X with the valve W disposed between the conduit R and the regulating valve V. The regulating valve V comprises a housing 12 having a passage 13 therethrough communicating lengths of the pipe T, a needle valve 14 threaded in the housing having its inner end presented to the passage 13 and adapted to be adjusted longitudinally to variably restrict said passage according to requirements.

The valves W–X are complementary, each embodying a housing 15 having a passage 16 communicating lengths of the pipe T with a spring pressed plunger valve 17 normally closing said passage which valve constitutes the core of a solenoid magnet 18 encased in the housing 15 operable when energized to advance the valve 17 in opposition to a spring bearing on the outer end of the valve to thereby open said passage. The terminals of the magnet 18 in the valve W are connected to the conductors u—u as are the terminals of the solenoid magnet 10 of the control valve G whereby when the time switch O is closed D.C. electric current will flow over conductors u—u to then energize the magnets 10 and 18 and thereby open the valves G and W which will remain open as long as the time switch is closed. FIG. 6 shows the valve W in its open position.

One of the terminals of the magnet 18 of the valve X connects with the positive conductor u while the other terminal of said magnet connects with a conductor w which leads to a contact member on a rocker arm x pivoted on the upper side of the cover panel C and connected to the float U by a stem y; the arm x constituting one element of a float controlled switch Y the other element of which comprises an arm z bearing a contact member with which the negative conductor u connects. The contact members of the switch arms x–z are arranged to be out of contact when the float U is in its uppermost position as shown in FIGS. 1 and 2 thus opening the circuit through the magnet 18 of valve X, but to be disposed in contact when the float is lowered as shown in FIG. 4 to thereby close the circuit through the magnet 18 of valve X and thus open the latter.

In the initial application of the apparatus, the aquarium is filled to a requisite level with a body of fresh water, and such that when the cover panel C is set in place, the float U will be supported so as to hold the rocker arm x in its elevated switch opening position, as shown in FIG. 2.

The time switch O is then set in the usual manner to remain open for a determined length of time and electric current directed thereto by closing the switch j, thereby setting the clock motor r in operation and rotating the cam P which usually makes one revolution in twenty four hours and holds the switch arms l—l in their open, circuit breaking position during the greater part of this period. At an elected time the cam P moves to a position such as to permit the switch arms l—l to move to their closed position as indicated in FIG. 3, thus closing the switch O for a short period during which A.C. electric current will be directed to the transformer Q by the conductors t—t to be thereby converted into direct current which will coincidentally flow through and energize the motor M, and the magnets 10 and 18 of the valves G and W, thereby driving the motor M and opening the valves G and W.

Operation of the motor M actuates the pump F so as to evacuate water from the aquarium through the tube D, conduit E, the then open valve G, past the check valve H into the pump F, from which the evacuated water is discharged through conduit I and check valve J. This water removing operation continues as long as the time switch O remains closed, and terminates on opening of the switch, if the evacuation of water is not sooner terminated on the surface of the water being lowered sufficient to open the siphon breaking aperture D′.

Lowering of the water level lowers the float U so as to close the switch Y and thereby direct electric current through the magnet 18 of the valve X thereby opening the latter to the passage of water from the supply pipe R through the then open valve W and the regulating valve V.

This delivery of the fresh water to the aquarium is regulated so as to continue until the level of the water has been restored to normal and the float U elevated to a position to open the switch Y before the time switch O opens and cuts off the supply of direct current. On opening the switch Y the magnet 18 in the valve X is de-energized so that the valve X will automatically close, thus shutting off the feed of fresh water to the aquarium.

The applied apparatus will function to effect removal and replacement of the aquarium water only during the period of time during which the time switch O is closed, which period may be of any set duration with the successive periods spaced apart any elected period according to requirements and within the range or capacity of the particular time switch employed; the pumping operation occuring throughout the period of closing of the switch O to effect removal of a predetermined portion of the aquarium water and during which period the replacement of the removed water by incoming fresh water will be effected under the control of the float U which acts to effect opening of the feed valve X when the float is lowered on lowering the level of the aquarium water by action of the discharge pump.

Where the tank A is of small capacity, for example five gallon tank, the removal and replacement of a portion of the aquarium water is preferably effected once every twenty-four hours, while in a tank of large capacity, for example a fifty gallon tank, removing and replacing of a portion of the aquarium water is preferably effected every two hours.

By the provision of the syphon breaking aperture D′ in the discharge tube D together with the normally closed outlet valve G, the removal of an excessive volume of aquarium water is prevented and by the provision of the pair of normally closed inlet valves X and W the delivery of an excessive volume of water to the aquarium, such as to cause overflow thereof, is prevented.

By the provision of the pair of cut-off inlet valves X and W on opposite sides of the manually adjustable regulating valve W, the initial ejection of an undesirable violent jet from the feed pipe T will be prevented, since the restricted valve V together with restriction of the valve W when opened will act to considerably reduce the water pressure delivered through the feed pipe T relative to the pressure in the supply pipe R.

From the foregoing it will be seen that the apparatus embodies a discharge conduit leading from the aquarium and a fresh water feedpipe leading to the aquarium from a source of water supply under pressure, in which the discharge conduit is normally closed by a cut-off valve and the feed-pipe is normally closed by a pair of independent cut-off valves independently automatically controlled, one by the time switch the other by a float thus insuring against flooding of the aquarium.

I claim:

1. In an apparatus for conditioning aquariums, the combination of a tank, means for evacuating water from said tank embodying a pump, a motor for actuating said pump, and timing mechanism for operating said motor at periodic intervals, float controlled means for delivering fresh water to said tank in replacement of the evacuated water; said float controlled means embodying a feed pipe leading from a source of water supply under pressure to said tank, a normally closed cut-off valve in said pipe, a solenoid magnet for opening said valve, a float in said aquarium, means actuated by downward movement of said float for energizing said magnet to open said valve; together with a normally closed second cut-off valve in said feed pipe between said first named cut-off valve and the source of water supply, a solenoid magnet for opening said second cut-off valve, and means controlled by said timing mechanism for energizing said last named magnet co-incident with operation of said motor.

2. In an aquarium, the combination of a tank for containing a volume of water, a water-feed-pipe leading into said tank from a source of water supply under pressure, a pressure regulator in said feed-pipe, a normally closed cut-off valve in said pipe between said pressure regulator and said tank, a solenoid for opening said valve when energized, a float in said tank, a normally open switch controlling a circuit through said solenoid, connections between said float and switch operable to close said switch to energize said magnet and open said valve when said float moves downward on lowering the level of the water in said tank, means for periodically evacuating a portion of the water in said tank; said last named means embodying a pump, a water discharge tube having one end thereof leading downwardly into the water contained in said tank and having its other end connected to the intake of said pump, said pump having an outlet conduit leading to discharge, a motor, means actuated by said motor for operating said pump, and a time-switch controlling said motor at periodic intervals.

3. The combination called for in claim 2 in which the downwardly leading end of said water discharge tube has a siphon breaking aperture located a distance below the normal level of the body of water contained in the tank.

4. The combination called for in claim 2 including a normally closed cut-off valve in said discharge pipe, a solenoid for opening said valve when energized, means for energizing said solenoid co-incident with operation of said motor.

5. The combination called for in claim 2 including a normally closed cut-off valve in said discharge pipe, a solenoid for opening said valve when energized, means for energizing said solenoid co-incident with operation of said motor, and a check-valve in both the intake tube and the outlet conduit preventing back-flow through said tube and conduit.

6. In an aquarium, the combination of a tank for containing a body of water, a float in said tank, a feed-pipe opening to said tank leading from a source of water supply under pressure, a normally closed solenoid valve in said feed pipe, means controlled by said float for opening said valve when said float moves downward, a pump having an intake and an outlet, a water discharge tube having one end leading downwardly into the body of water in said tank and having its other end connected to said pump intake, a motor, means actuated by said motor for operating said pump, a time-switch for controlling actuation of said motor at periodic intervals, a normally closed water discharge tube having one end leading downwardly into the water in said tank and having its other end connected to said pump intake, a normally closed solenoid cut-off valve in said tube, means controlled by said time switch for opening said last named solenoid valve on starting said motor, and holding it open during operation thereof, means for directing alternating current to and from said time switch to actuate the latter, a transformer, means for directing alternating current from said time switch to said transformer when said switch is closed to convert said current into direct current and means for conducting direct current from said transformer to said motor and to each of said cut-off valves during closing of said time-switch.

7. The combination called for in claim 6 together with a second normally closed solenoid cut-off valve in said water feed-pipe and means for conducting direct current to said valve to hold the latter open co-incident with opening of each of the aforesaid solenoid valves.

8. The combination called for in claim 7 together with a regulating valve in said water feed-pipe between the cut-off valves therein.

References Cited by the Examiner
UNITED STATES PATENTS

| | | | |
|---|---|---|---|
| 2,672,845 | 3/1954 | Schneithorst | 119—5 |
| 2,877,467 | 3/1959 | Cloud | 137—624.11 |
| 2,908,105 | 10/1959 | Rogers | 43—55 |
| 3,103,763 | 9/1963 | Malchair | 47—1.2 |

SAMUEL KOREN, *Primary Examiner.*

HUGH R. CHAMBLEE, *Examiner.*